Feb. 20, 1962     G. SLAYTER ET AL     3,021,563
METHOD FOR PRODUCING AND TREATING FIBERS
Original Filed Feb. 7, 1951     3 Sheets-Sheet 1
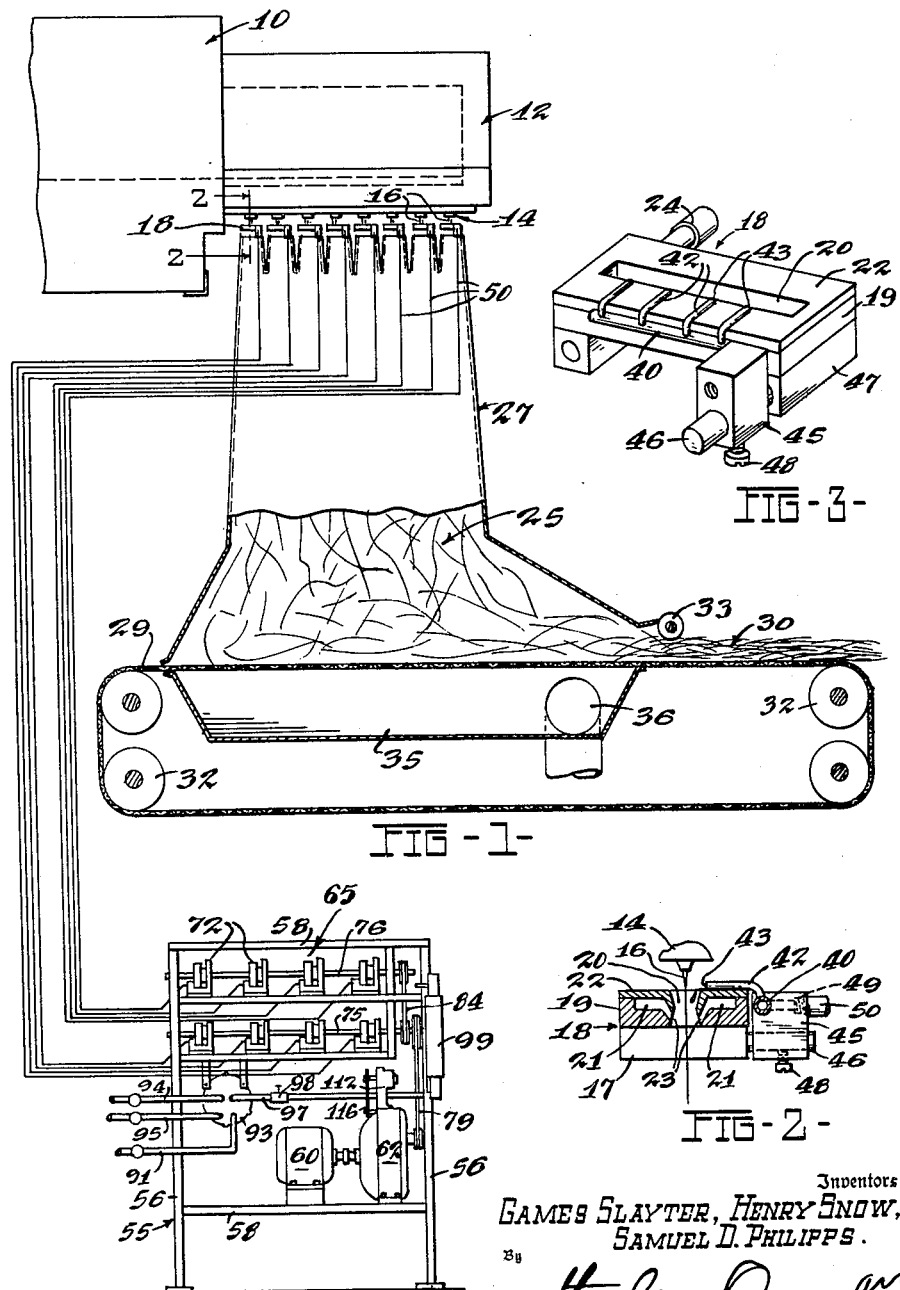
Inventors:
GAMES SLAYTER, HENRY SNOW,
SAMUEL D. PHILIPPS.

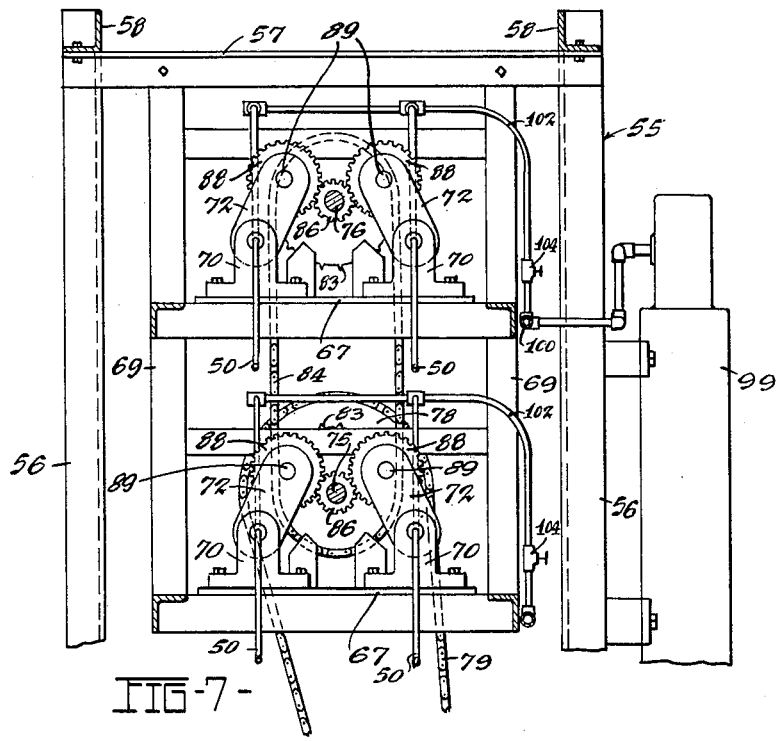
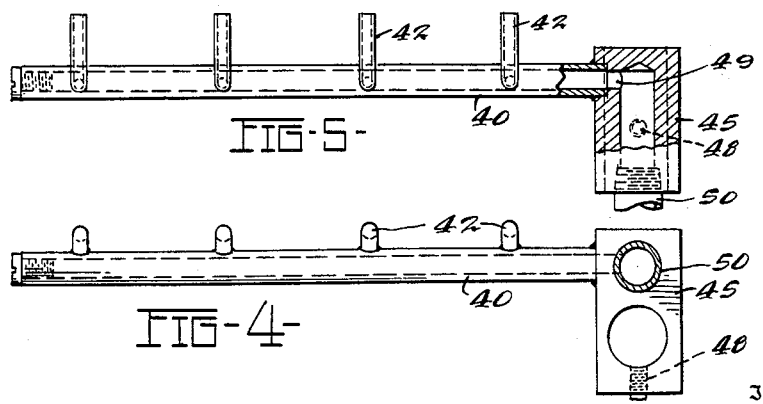

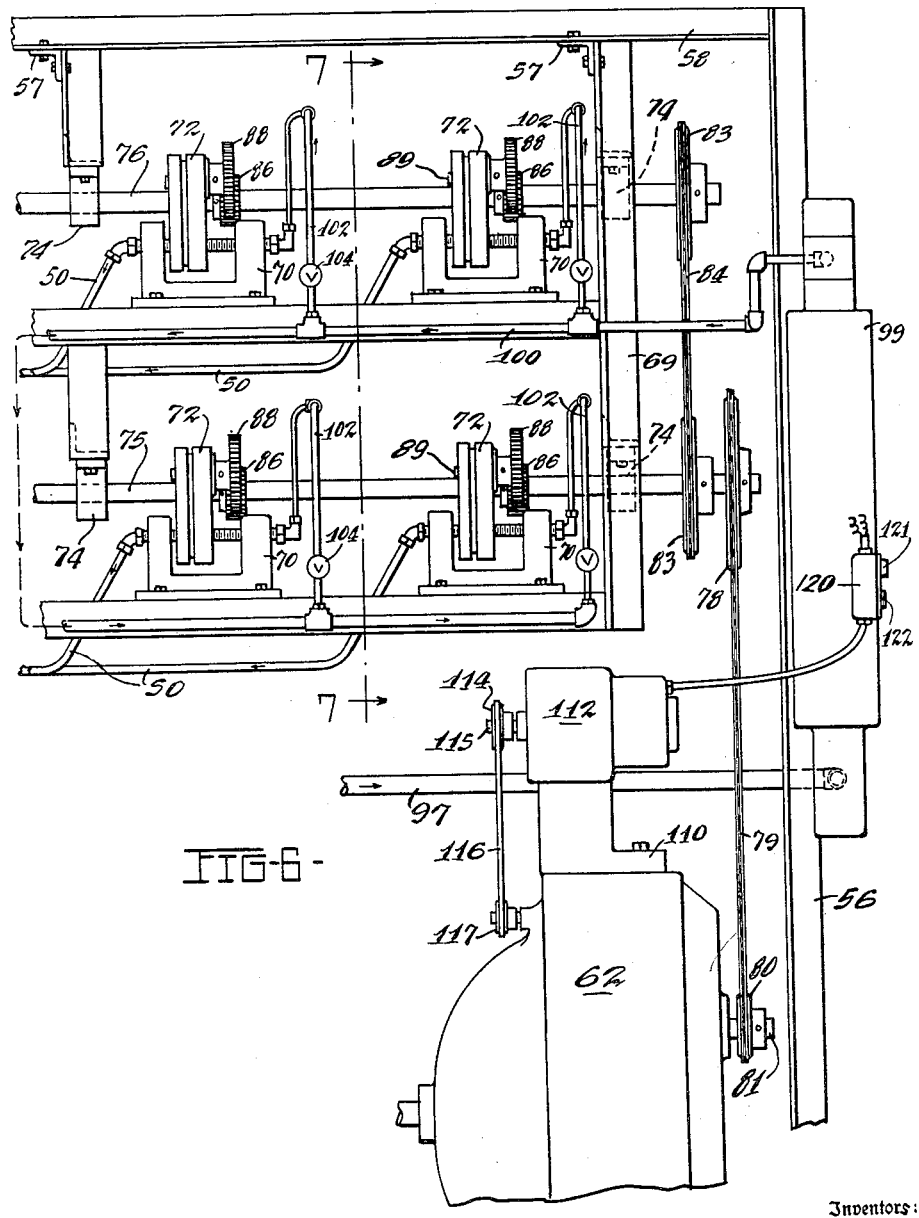

3,021,563
METHOD FOR PRODUCING AND
TREATING FIBERS
Games Slayter and Henry J. Snow, Newark, and Samuel
D. Philipps, Granville, Ohio, assignors to Owens-Corning Fiberglas Corporation, a corporation of Delaware
Original application Feb. 7, 1951, Ser. No. 209,782. Divided and this application July 14, 1960, Ser. No. 42,819
4 Claims. (Cl. 18—47.3)

This invention relates to a method of forming and processing fibers derived from heat-softenable fiber-forming materials and more especially to the production and treatment of fibers formed from mineral materials such as glass, rock, slag or the like, and is a continuation of our application Serial Number 602,389, filed August 6, 1956, now abandoned which is a division of our application Serial Number 209,782, filed February 7, 1951, now Patent Number 2,763,099.

In the manufacture of mineral fibers and especially those formed of glass which are collected and processed to form mats or like constructions particularly usable for heat and sound insulation or kindred purposes, streams of molten glass flowing from a supply are acted upon or engaged by blasts of steam or compressed air to draw or attenuate the streams to fibers. The formed fibers are usually collected or accumulated upon a moving foraminous conveyor to a thickness to form mats of desired dimensions and characteristics for particular purposes. Such a process is disclosed in the Slayter and Thomas Patent No. 2,133,236.

For certain uses the collected fibers are impregnated with a lubricant and a suitable binder, such as phenol formaldehyde, which is subsequently cured in a heated zone to provide for mass integrity in the mat. Other forms of mat for particular purposes are treated solely with lubricant or other suitable material to minimize interabrasion of the fibers and the application of binder omitted where a substantial degree of mass integrity is not required. Heretofore the lubricant or coating material in liquid form has been applied to the fibers after their attenuation, by being directed into a forming hood and onto the accumulated fibers on the conveyor, or otherwise introduced into the attenuating blast of steam or compressed air that conveys the fibers from the attenuating zone to the collecting station.

The method above mentioned of fiber formation is conventionally referred to as a blowing process and the resulting product termed blown fibers. It is known that glass surfaces have an unusual affinity for moisture and that it is necessary to subject the glass to temperatures of eight hundred degrees Fahrenheit or higher in order to drive off or volatilize all moisture from the glass surfaces. In the above mentioned methods of introducing lubricant or fiber coating material with the steam blast or after the steam has engaged the fibers and at least to some extent condensed on the fiber surfaces, the surfaces of the fibers may be wetted and acquire a film or layer of moisture from the steam blast so that the lubricant or coating material may not directly reach the surfaces of the fibers but may form a film or coating superposed upon the moisture layer on the fibers.

Under these conditions a comparatively large quantity of lubricant or coating medium is required to satisfactorily minimize interabrasion of the fibers. The fibers so formed may vary from a few inches to several feet in length, and longer fibers are desirable as their presence improves the strength characteristics of mats formed from the fibers. The application of lubricant or other material to the wetted or moisture-bearing fibers by the methods above pointed out requires the use of comparatively large quantities of lubricant or other material in order to effectively lubricate the fibers, a condition necessarily detracting from the inorganic characteristics of the product.

It has been found that the degree of thoroughness of application and distribution of lubricant to the fibers apparently has a definite affect upon the lengths of the fibers accumulated in the collecting zone. In instances where the fibers are insufficiently lubricated, the fibers tend to form in shorter lengths than those provided with adequate lubrication. As longer fibers appear to be produced under conditions where the fibers are adequately lubricated, this result is believed to be attributable to a decreased opportunity or tendency for the fibers to abrade and cut one another.

The present invention embraces a method of attenuating mineral fibers in a zone in which a material or medium is provided for isolating and treating the newly formed surfaces of the fibers before they are subjected to atmospheric conditions.

The invention contemplates a method of supplying a nonaqueous substance to a zone adjacent newly formed fiber surfaces whereby the surfaces are caused to acquire or absorb a protective layer or film of the substance.

The invention has for an object the provision of a method of treating mineral fibers in a manner facilitating the formation of longer fibers with a minimum of interabrasion of the fibers whereby an assemblage of fibers having improved strength and insulating characteristics is produced.

Another object is the provision of a method of treating mineral fibers during attenuation or formation thereof by the application of material in liquid or vapor state to the fibers at a zone in advance of the application of the attenuating force on the fibers whereby a minimum of material is required to satisfactorily coat the fibers whereby fibers of greater lengths are produced.

A further object is the provision of a method of delivering a suitable lubricant into a zone of fiber attenuation in liquid or vapor state or concomitantly in both forms for directing the lubricant onto the fibers in a region where the fibers have a reduced tendency to absorb moisture from the atmosphere or from blasts of steam utilized as a fiber attenuating force.

Another object resides in a method of utilizing an induced air stream establised by a gaseous fiber attenuating medium for conveying lubricant or other fiber coating material into intimate contact with the streams of fiber-forming material in the region of attenuation.

Another object of the invention resides in the provision of a method of delivering lubricant into a zone adjacent streams of material from which fibers are formed in a manner providing for effective control of delivery of lubricant in liquid or vapor form through regulation of the relative position of the lubricant delivering means in respect to the streams of fiber-forming material to utilize the radiated heat from the streams of material, the receptacle containing the supply of molten material, and from the fiber attenuating means for varying the proportions of volatile and liquid lubricant delivered to the zone and for securing optimum temperatures thereof for efficient operation.

Another object of the invention resides in the provision of a method by delivering lubricant into a zone adjacent the streams of fiber-forming material or fibers formed therefrom wherein radiant heat from the molten material and the fiber attenuating medium is utilized to facilitate the deposition of a layer or film of lubricant upon the fibers.

Another object resides in the provision of a method of delivering fiber coating material to a plurality of fiber attenuating zones including means for establishing a predetermined rate of flow of coating material to each of said zones whereby accurate control of the amount of material supplied to the fibers may be exercised and a substantially uniform layer or film deposited upon the fibers whereby substantial economies in amount of coating material are effected.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic elevational view of an apparatus for producing blown fibers of mineral materials embodying the present invention;

FIGURE 2 is a detail sectional view taken substantially on the line 2—2 of FIGURE 1 illustrating one of the blowers and fiber coating means;

FIGURE 3 is an isometric view of one of the blower elements illustrating a form of means for delivering lubricant or fiber coating meaterial associated therewith;

FIGURE 4 is an elevational view of one of the material distributing manifolds forming an element of the invention;

FIGURE 5 is a top plan view of the manifold shown in FIGURE 4, certain parts being broken away for purposes of illustration;

FIGURE 6 is an elevational view of the material allocating and pumping means and driving and control means therefor, and FIGURE 7 is a sectional view of the material allocating and pumping means, the view being taken substantially on the line 7—7 of FIGURE 6.

A preferred arrangement for carrying out the method of the invention has been illustrated in connection with apparatus for producing blown fibers from mineral fiber-forming materials but it is to be understood that the incorporation and use of the invention is contemplated with other methods and arrangements of producing fibers from heat-softenable materials wherever the same may be found to have utility.

The invention has been found to have particular adaptability with apparatus for producing blown fibers of glass sometimes referred to as glass wool, wherein blasts of steam or other gas are directed into engagement with streams of molten glass in a direction to draw out or attenuate the streams to fiber form by the velocity of the blasts. The fibers formed by this method are usable for many purposes, for forming mats or bats for heat and sound insulation both bonded and unbonded forms, roofing materials, filter packs, protective coverings and other kindred uses.

Referring to the drawings, FIGURE 1 illustrates in semidiagrammatic form an apparatus for carrying out the method of the invention for producing blown fibers and assembling or collecting them in an interfelted mass to produce mats or bats which may be fashioned in varying thicknesses and sizes dependent upon the particular purposes for which they are to be used. A melting and refining tank or furnace 10 is shown adapted to contain a supply of heat-softenable, fiber-forming material, as for example, glass, fusible rock or slag, the tank being provided with a forehearth 12. The floor of the forehearth is provided with a plurality of feeders or bushings 14, each formed with a comparatively large number of small orifices or openings through which the molten glass or other fiber-forming material flows in a multiplicity of small streams 16 which are acted upon by an attenuating means.

In the form of apparatus illustrated, the streams are attenuated to fibers by blasts of steam or other gas issuing from a plurality of blowers 18, one being disposed beneath each of the feeders 14. In the illustrated apparatus there are two rows of feeders with eight feeders in each row, one row being shown in FIGURE 1. One of the blowers 18 is illustrated in FIGURES 2 and 3 and includes a fitting 19 provided with an elongated slot or passage 20 through which flow the streams of glass 16.

The fitting 19 is formed with passages or ducts 21 which form with depending portions of a cover plate 22 longitudinal slots or openings 23 for directing blasts of steam downwardly in the general direction of movement of the streams 16, steam or other gas under pressure being supplied to the fitting through a tube or pipe 24. The blasts of steam issuing from the openings 23 impinge upon the streams 16 and draw or attenuate them into fibers 25 of varying lengths. The blower 18 may be the same as that described in the Slayter Patent 2,206,060.

The action of the blasts converging on the streams induces a rapid flow of induced air over the top of the blower and downwardly along the streams. This induced air engages the streams in advance of the contact of the streams by the attenuating blasts coming from the blower.

Disposed beneath the forehearth 12 is a forming hood 27 which provides an accumulating chamber or zone within which the formed fibers are deposited on a suitable means such as the upper flight of a reticulated or foraminous conveyor belt 29. The fibers are collected or deposited in haphazard interfelted relation to form a mat 30. The conveyor belt may be supported upon rollers 32 which are driven by suitable means (not shown) for continuously advancing the mat as it is formed in a right-hand direction as viewed in FIGURE 1.

At the forward portion of the hood there is disposed a roller 33 which may be employed to compact the mat to a predetermined depth as it emerges from the hood 27. Arranged beneath the upper flight of the conveyor 29 and in registry with the hood or chamber 27 is an exhaust chamber 35 connected by means of a duct or pipe 36 with a suction producing blower for establishing a reduced pressure in the chamber 35 to carry away the expended steam and facilitate the deposition of fibers on the conveyor.

The apparatus described functions in the following manner: The molten glass or other heat-softenable material in the tank 10 is continuously supplied to the forehearth 12 and flows through the orifices formed in the feeders 14 to provide a multiplicity of streams 16 which move downwardly through the elongated passages 20 formed in the fittings 19 of the blowers 18. The blasts of steam or other gas issuing from the jets 23 engage the glass streams to draw or attenuate them to fibers. The fibers so formed are of varying lengths from a few inches to several feet and are collected upon the conveyor 29 in mat formation and continuously moved away from the hood 27 by the conveyor.

Heretofore it has been the practice to apply a lubricant or sizing to the fibers by introducing liquid lubricant into the steam blasts or by spraying lubricant onto the formed fibers in the hood 27 or onto the accumulated fibers as they emerge from the hood. In such methods the lubricant is applied to the formed fibers after they have been exposed to the atmosphere and acquired a film of moisture either from the atmosphere or from water vapor condensed from the steam as the fibers move away from the zone of the blasts.

Due to the fact that the fibers were in wetted condition and did not readily acquire a film of lubricant or to inefficiency in applying the lubricant, or to some other reason, comparatively large quantities of lubricant or sizing material were required in order to coat the fibers sufficiently to effectively reduce fiber interabrasion. The necessary amount of lubricant used not only increased the cost of the mats but also detracted from the inorganic properties of the mat.

It has been found that the affinity of a glass surface to acquire or absorb moisture is exceptionally high and that in order to substantially eradicate the moisture film from a glass surface it must be subjected to an elevated temperature of upwards of eight hundred degrees Fahrenheit or more. The present invention is inclusive of a method and means which apparently has the effect of substantially isolating or preventing the fibers from acquiring or absorbing moisture to any appreciable extent before the application of a nonaqueous material such as a lubricant. This appears to result from application of the material at a zone in advance of engagement of the attenuating blasts with the fibers and before the streams of glass or fibers have cooled below a temperature at which they readily absorb or acquire a layer of moisture.

A preferred arrangement for accomplishing this purpose involves continuously feeding liquid coating material or lubricant to a zone adjacent the molten streams of fiber-forming material where the coating material or lubricant may be discharged in liquid form or in a vapor state or concomitantly in both forms dependent upon the relative position of the outlets with respect to the molten streams and hence the amount of heat effective to elevate the temperature of the lubricant at the zone of discharge. The apparatus is inclusive of a lubricant distributing manifold 40 arranged adjacent each of the blowers 18, each manifold being provided with branch pipes or tubes 42 having their discharge outlets 43 above and adjacent the passage 20 of the adjacent blower as shown in FIGURES 2 and 3.

Each manifold 40 is mounted upon a member 45 which is bored to accommodate a supporting means in the form of a projection or stub shaft 46 formed on one of a pair of blocks 47 supporting the blower fitting 19. The member 45, carrying the manifold and branch pipes, is slidably adjustable along the projection 46 and may be locked in adjusted position by means of a screw 48.

Each of the members 45 is connected with an independent lubricant supply pipe or line 50 connected with means for establishing continuous flow of lubricant at a controlled rate. The members 45 are formed with passages 49 for establishing communication between the supply tubes 50 and the manifold 40.

Apparatus for supplying fiber coating oil or lubricant to each of the manifolds and controlling the flow rate thereof is illustrated in FIGURES 1, 6 and 7 and is supported upon a frame 55 formed with upwardly extending posts 56 joined by transversely extending members 57 and longitudinally disposed members 58. Mounted upon the lowermost set of members 58 is an electrically energizable motor 60, which drives the lubricant pumping and distributing means through a suitable speed reducing mechanism contained within a housing 62 also supported on the lowermost members 58.

The forehearth 12 as has been stated is provided with two parallel rows of glass feeders 14 each row containing eight feeders. An individual lubricant pumping or distributing means is preferably provided for each feeder and as illustrated in FIGURE 1 sixteen pumps designated 65 are arranged to be driven simultaneously from the speed reducing mechanism 62.

As shown in FIGURES 1, 6 and 7 the pumps are arranged in two groups or banks, one above the other, mounted upon uniplanar supports 67 suspended from upper cross members 57 by depending bars 69. Each group includes eight pumps arranged for purposes of compactness in parallel rows of four each. The pump structure of each unit includes a base 70 which supports a pump casing 72 enclosing pumping gears or other suitable means for distributing lubricant at a constant flow to the discharge outlets adjacent the blowers.

Journaled in suitable bearings 74 is a pair of shafts 75 and 76 respectively disposed adjacent the groups of pumps. The lower shaft 75 supports a sprocket 78 connected by a chain 79 with a driving sprocket 80 mounted upon a shaft 81 of the speed reducing mechanism. The shaft 76 is driven through the medium of sprockets 83 and chain 84 from shaft 75 in the manner illustrated in FIGURE 6.

Mounted upon shafts 75 and 76 are pinions 86 enmeshed with gears 88, each of which is supported upon a shaft 89 forming an element of each pumping unit. As illustrated in FIGURES 6 and 7, the shafts 75 and 76 are driven from the motor 60 through the speed reducing mechanism 62 and the pump units 72 driven from the shafts through the sets of pinions 86 and gears 88 so that all of the units may be driven simultaneously.

The lubricant or other fiber coating liquid may be supplied from a tank or reservoir (not shown) by a tube or pipe 91. It is desirable in order to assure uniform viscosity and flowability of the lubricant to elevate the temperature thereof to a predetermined point and thus eliminate viscosity variations of the lubricant due to temperature changes of the lubricant supply. One form of heating unit for accomplishing this purpose is illustrated in FIGURE 1 and includes a chamber 93 through which circulates steam or other heating medium through inlet and outlet pipes 94 and 95. A group of lubricant conveying coils (not shown) is disposed within the casing 93 connected with the oil supply tube 91 and an outlet tube 97 which conducts the oil to a flow rate indicating device 99 of conventional recording character. A filter 98 may be intercalated with the tube 97 for preventing passage of foreign particles that may be entrained in the lubricant.

A manifold or distribution tube 100 conveys the lubricant from the flow rate indicating device 99 to the several pumps through branch tubes 102. A valve 104 is included in each branch tube 102 so as to regulate the flow of oil to the pump and the manifold supplied with oil therefrom. The outlet or pressure side of each of the pumps 72 is connected by one of the tubes 50 with one of the manifolds 40 whereby a predetermined flow of lubricant is established to each of the zones above the blowers. The valves 104 provide a means to regulate or control the flow to the individual attenuating zones or to shut off the flow of lubricant in the event that the flow of fiber forming material is interrupted at a feeder.

Means is provided for regulating the speed of the pumps through a control of the speed of rotation of the shaft 81 of the speed reducing mechanism contained in housing 62. A bracket 110 mounted upon housing 62 supports a motor 112 which is of the reversible type. A sprocket 114 mounted upon the motor shaft 115 is connected by a chain 116 with a sprocket 117 which is connected to a speed varying means of conventional character (not shown) contained within the housing 62. The circuit of the motor 112 includes switches contained within a housing 120 arranged to be manually operated by means of push buttons 121 and 122. Selective closing of the switches effects operation of the motor 112 in either direction to actuate means in the housing 62 to change the rate of rotation of the shaft 81 and hence the speed of operation of the pumps. In this manner, an operator may instantly regulate and control the rate of flow of lubricant to the several attenuating zones.

The operation of the apparatus is as follows: The motor 60 is energized to actuate the speed reducing mechanism 62, which drives the banks or groups of pumps through the chains 79, 84 and the sprockets associated therewith. The lubricant is supplied to the heating device 93 either by gravity flow or an auxiliary feed pump through the inlet tube 91, the lubricant being conveyed by tube 97 through the flow rate indicator 99 thence through the tube or pipe 100 to the several branch pipes 102, each of which is connected to one of the pumps 72.

Operation of the pumps forces the lubricant through the tubes 50 to the several manifolds 40, the lubricant being discharged through outlets 43 into the fiber attenuating zones. The rate of feed of lubricant may be varied by manipulation of the switch controlling buttons 121 and 122 to effect rotation of the motor 112 in the proper direction to increase or decrease the speed of the pumps 72 by changing the speed of the shaft 81 of the speed reducing mechanism.

It has been found that the lubricant may pass into the attenuating zones in a liquid state, a volatilized or vapor state or simultaneously in both forms or states depending upon the temperatures in the zones of the lubricant discharge tubes 42. It is a practice to utilize superheated steam of a temperature upwards of four hundred degrees Fahrenheit for the attenuating blasts emanating from the blowers 14. The forehearths, glass feeders and molten streams of glass are usually at a temperature in excess of two thousand degrees Fahrenheit so that the discharge tubes 42, and especially the forward portions thereof adjacent the lubricant outlets 43, are subjected to comparatively high temperatures dependent in a measure upon the position of adjustment of the manifolds 40 and tubes 42 relative to the blowers 14.

Such temperatures are well above the vaporization temperature of the oils or lubricants utilized in the present method. During operation of the apparatus, a blue haze is often visually discernable above the blowers adjacent the streams, evidencing the conversion or transmutation of some or a substantial amount of the liquid lubricant to a volatile or vapor state. The proportions of oil vapor and liquid exuded from the outlets may be controlled or regulated by varying the relative position of the tubes 42. The presence of the oil vapor in the attenuating zones provides a medium for substantially isolating or protecting the newly formed surfaces of the fibers or glass bodies during attenuation from the atmosphere and from direct contact with the steam from the blasts so that the fibers are coated with a film or layer of liquid lubricant or vapor before they can acquire a coating of moisture. As the force of the blasts from the blowers normally induces the flow of some air through the passages 20, such force in the present method continuously induces a downward flow of oil vapor into the passages 20 to establish intimate contact of the oil with the fibers before they are engaged by the steam blasts.

The molten streams of glass, as they travel through the space between the feeders and the upper surfaces of the blowers 18, are of a temperature well above eight hundred degrees Fahrenheit, this being the approximate maximum temperature at which moisture will adhere to or be obsorbed by a glass surface, so it is apparent that even though the streams are exposed to the atmosphere immediately below the feeders, no moisture will be acquired by the molten streams because of the high temperature.

Many advantages are attained through the present invention. It is found that fibers formed in this manner are of greater length, a factor which improves the strength characteristics of the mat or assembly of fibers. Such mats may be repeatedly flexed without fracture or disintegration of mass formation, thus providing mats that will adequately withstand rough handling during transportation and installation. Furthermore the application of the lubricant to the moisture-free glass surfaces facilitates a uniform distribution of a film of lubricant on each fiber and greatly reduces the amount of lubricant that has heretofore been necessary to coat fibers. The inorganic characteristics of a mat formed of fibers that are lubricated and attenuated in accordance with the present method are not unduly affected by the small amount of lubricant applied to the fibers.

In carrying out the method of the present invention, it has been found that the lubricant film or layer adheres to the surfaces of the fibers with great tenacity. This may possibly be due to the condition that a newly formed glass surface, before it has an opportunity to react with moisture or oxygen in the atmosphere, is of a highly reactive or affinitive nature and readily seizes upon or acquires a film or layer of an adjacent medium or coating material even though the materials may be considered as normally inert.

The tenaciousness with which the coating adheres to the glass surfaces is of such character that a chemical change or reaction may be present augmenting the union between the applied material and the glass surfaces. The coating materials such as mineral oils have been found to impart an extremely high abrasion resistance to the glass fiber surfaces and are apparently more tightly bonded, joined or absorbed on the glass surfaces than a layer of moisture.

The method of the invention embraces the application of materials other than oils to the newly formed fiber surfaces which materials may be either in liquid or vapor form when exuded from the outlets 43 or other discharge means into the zone of fiber formation. The fibers during formation, depending upon their ultimate use for particular purposes, may be subjected to or coated with silicone vapors, sizing materials or resins having thermoplastic properties; and in instances where resin is used, the resinous coated fibers may be subsequently heat treated as by passing the coated fibrous mass through an oven at elevated temperature to cure or set the resin.

As a practical example of producing a resin bonded mass or mat of fibers according to the present invention, a resin binder such as uncured of partially polymerized phenol formaldehyde, sometimes referred to as stage "A" or stage "B" resin may be injected into the attenuating region above the attenuating blowers, the coated fibers collected into mat formation, compressed to the desired density by means of the roller 31 or similar means, and heated to convert the resin to be fused state for interbonding the fibers.

The process of the present invention may be used to advantage in imparting color to the fibers. This may be accomplished by projecting or exuding a dyed or pigmented material such as resin, wax or other coating agent into the attenuating region above the attenuating means thus imparting a colored film or coating which adheres tenaciously to the fiber surfaces. In lieu of a pigmented resin, a dye such as a metal halide may be employed of a character which will react with the newly formed fiber surfaces providing an integrated colored coating on the fibers.

Various fiber coating materials may be delivered to the attenuating zones in advance of the attenuating blasts such as bitumens, asphalt, thermosetting and thermoplastic resins, petroleum oils, waxes, silicone resins and silicone oils, dyes and the like. Resinous sizing materials of thermoplastic character may be used having, in the case of some products, the advantage of the fact that when the size-bearing fibers cool below three hundred or four hundred degrees Fahrenheit, the coating or sizing is hardened or set.

The success of the method of the invention is believed to be attributable to several factors as herein pointed out including the provision of a medium in the heated zone of attenuation between the feeders and the application of the attenuating forces forming a barrier for isolating or shielding the fibers during attenuation from direct contact with the atmosphere and concomitantly imparting a film or coating to the highly reactive or affinitive glass surfaces before they are engaged by the attenuating means. Furthermore it is desirable in order to secure most satisfactory results to supply a material or medium of non-aqueous character to the attenuating zone as less material is required to establish an abrasion resistant film or layer on the fiber surfaces.

In supplying a lubricant such as petroleum oil to the region of attenuation according to the method herein disclosed, generally longer fibers appear to be formed as compared with those produced by heretofore known methods of applying lubricant to mineral fibers. Several factors may be involved in attaining the production of longer fibers.

It may be that the lubricant coats the streams or fibers being drawn therefrom or establishes a protective sheath in the initial or early stages of the attenuating process which tends to insulate the attenuating region and retard heat losses whereby the fibers are enabled to cool more slowly and may be attenuated to a greater extent. It may be that the lubricant is carried by the induced air stream into intimate contact with the streams of fiber-forming material thereby providing a lubricant film that is drawn out with the streams concomitantly with attenuation thereof without disruption of the film whereby effective distribution of lubricant on the fibers is attained, a possible factor involved in the production of longer fibers through the utilization of the method of the invention.

It is apparent that, within the scope of the invention, modificaions and different arrangements may be made other than is herein disclosed, and the present disclosure is illustrative merely, the invention comprehending all variations thereof.

We claim:

1. A method of producing fibers from heat-softenable mineral material including maintaining a supply of the heat-softenable material in a molten state, flowing a stream of the molten material from the supply, directing a blast of gas in the general direction of flow of the stream into engagement therewith to attenuate the stream to fibers, conveying a nonaqueous liquid to a zone adjacent and at the side of the stream, flowing the liquid into contact with a heated surface normal to the direction of flow of the stream and adjacent the stream, and volatilizing some of the nonaqueous liquid on the surface by the heat from the molten material to establish a vapor of the liquid adjacent the stream.

2. A method of producing fibers from heat-softenable mineral material including maintaining a supply of the heat-softenable material in a molten state, flowing a plurality of streams of the molten material from the supply, directing blasts of gas in the general direction of flow of the streams into engagement therewith to attenuate the streams to fibers, conveying oil in a liquid state to a zone adjacent the streams, and dispersing the liquid oil adjacent a heated surface substantially normal to the direction of flow of the streams whereby some of the liquid oil is vaporized by the heat of the streams and the heated surface establishing an oil vapor surrounding the streams of mineral material.

3. A method of producing fibers from heat-softenable mineral material including maintaining a supply of the heat-softenable material in a molten state, flowing a group of streams of the molten material from the supply through an elongated passage, directing a blast of gas in the general direction of flow of the streams into engagement therewith to attenuate the streams to fibers, conveying a volatilizable oil in a liquid state to a zone adjacent the passage, dispersing the oil onto a heated surface adjacent the passage and in advance of the zone of engagement of the blast with the streams of molten material, and volatilizing some of the oil on the surface by the heat from the streams of molten material establishing an atmosphere of oil vapor whereby the vapor surrounds the streams and is drawn into the passage by forces of induction of the blast.

4. A method of producing fibers from heat-softenable mineral material including maintaining a supply of the heat-softenable material in a molten state, flowing a group of streams of the molten mineral material from the supply through a generally rectangular passage, directing a high velocity blast of gas in the general direction of flow of the streams into engagement therewith to attenuate the streams to fibers, conveying a volatilizable oil in a liquid state to a zone adjacent the passage at one side of the group of streams, flowing the oil from outlets spaced lengthwise of the passage onto a heated surface adjacent the entrance of the passage, and volatilizing some of the oil on the surface by heat from the streams of molten material establishing an atmosphere of oil vapor surrounding the streams whereby the oil vapor is drawn into the passage by the forces of induction of the blast to isolate the streams of molten mineral material.

References Cited in the file of this patent

UNITED STATES PATENTS

| | | |
|---|---|---|
| 2,491,889 | Bennett et al. | Dec. 20, 1949 |
| 2,763,009 | Slayter et al. | Sept. 18, 1956 |